(12) United States Patent
Destain

(10) Patent No.: US 10,969,072 B2
(45) Date of Patent: Apr. 6, 2021

(54) LIGHTING SYSTEM FOR GENERATING SURFACE OR MID-AIR LIGHTING EFFECTS

(71) Applicant: SIGNIFY HOLDING B.V., Eindhoven (NL)

(72) Inventor: Patrick Rene Marie Destain, Allen, TX (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/488,135

(22) PCT Filed: Feb. 27, 2018

(86) PCT No.: PCT/EP2018/054802
§ 371 (c)(1),
(2) Date: Aug. 22, 2019

(87) PCT Pub. No.: WO2018/158246
PCT Pub. Date: Sep. 7, 2018

(65) Prior Publication Data
US 2020/0003378 A1 Jan. 2, 2020

Related U.S. Application Data

(60) Provisional application No. 62/466,444, filed on Mar. 3, 2017.

(30) Foreign Application Priority Data

Mar. 14, 2017 (EP) .................................... 17160813

(51) Int. Cl.
*F21S 10/00* (2006.01)
*F21V 5/00* (2018.01)
(Continued)

(52) U.S. Cl.
CPC .............. *F21S 10/00* (2013.01); *F21V 5/004* (2013.01); *F21V 5/008* (2013.01); *F21V 7/0041* (2013.01);
(Continued)

(58) Field of Classification Search
CPC .......... F21V 5/04; F21V 13/04; F21V 14/003; F21V 5/008; F21V 7/0033; F21V 7/0041;
(Continued)

(56) References Cited

U.S. PATENT DOCUMENTS 4,418,996 A 12/1983 Bellar et al.
4,843,529 A 6/1989 Izenour
(Continued)

FOREIGN PATENT DOCUMENTS

CN 103365051 A 7/2014
GB 2402998 A 12/2004
(Continued)

*Primary Examiner* — Peggy A Neils
(74) *Attorney, Agent, or Firm* — Daniel J. Piotrowski

(57) ABSTRACT

A lighting system, comprising: a light source (22) for generating a light source output; an optical system (24) for focusing the light source output to a beam control plane (26); a first lens system (28) for pre-shaping the light source output after the beam control plane; a first reflector (30), wherein the first lens system is adapted to direct light to the first reflector; a second reflector (32) for generating an output beam (34) from the light reflected by the first reflector; a beam control system (27) located at the beam control plane, wherein the beam control system includes a pixelated display device (27c) for providing pixelated modulation of the light passing through the display device, and wherein he first reflector and second reflector are selected from the group consisting of: the first reflector (30) is a hyperbolic mirror and the second reflector (32) is a parabolic mirror, the first reflector (30) is a hyperbolic mirror and the second reflector (32) is a hyperbolic mirror, the first reflector (30)
(Continued)

and second reflector (32) are spherical mirrors and the first reflector (30) is a planar mirror and the second reflector (32) is a hyperbolic mirror.

9 Claims, 5 Drawing Sheets

(51) Int. Cl.
- *F21V 7/00* (2006.01)
- *F21V 7/04* (2006.01)
- *F21V 13/14* (2006.01)
- *F21V 14/00* (2018.01)
- *F21Y 105/18* (2016.01)
- *F21Y 115/10* (2016.01)
- *F21W 131/406* (2006.01)

(52) U.S. Cl.
CPC ............... *F21V 7/04* (2013.01); *F21V 13/14* (2013.01); *F21V 14/003* (2013.01); *F21W 2131/406* (2013.01); *F21Y 2105/18* (2016.08); *F21Y 2115/10* (2016.08)

(58) Field of Classification Search
CPC ... F21V 7/04; F21V 11/08; F21S 10/00; F21S 10/02; F21W 2131/406; F21Y 2103/33; F21Y 2115/10; F21Y 2105/18; G02B 19/0028; G02B 19/0066; G03B 21/2066; G03B 21/28
See application file for complete search history.

(56) References Cited

U.S. PATENT DOCUMENTS

| | | | |
|---|---|---|---|
| 6,758,582 B1 * | 7/2004 | Hsiao | F21V 7/0025 362/302 |
| 6,799,852 B2 * | 10/2004 | Sekiguchi | G03B 21/208 353/102 |
| 8,786,766 B2 | 7/2014 | Wendt | |
| 9,897,304 B2 * | 2/2018 | Shum | F21V 23/006 |
| 10,067,413 B2 * | 9/2018 | Tajiri | F21V 14/04 |
| 10,132,473 B2 * | 11/2018 | Hansen | F21V 14/08 |
| 10,359,155 B2 * | 7/2019 | Hirasawa | F21V 9/30 |
| 2002/0015305 A1 * | 2/2002 | Bornhorst | F21V 9/40 362/293 |
| 2005/0162854 A1 | 7/2005 | Finch | |
| 2006/0028834 A1 * | 2/2006 | Miller | F21S 8/02 362/551 |
| 2006/0077667 A1 * | 4/2006 | Lui | F21V 5/006 362/300 |
| 2013/0070449 A1 * | 3/2013 | Hu | F21V 13/14 362/231 |

FOREIGN PATENT DOCUMENTS

| | | |
|---|---|---|
| WO | 03069219 A1 | 8/2003 |
| WO | 2012163964 A1 | 12/2012 |
| WO | 2013149888 A1 | 10/2013 |
| WO | 2016067822 A1 | 8/2017 |

* cited by examiner

LIGHTING SYSTEM FOR GENERATING SURFACE OR MID-AIR LIGHTING EFFECTS

CROSS-REFERENCE TO PRIOR APPLICATIONS

This application is the U.S. National Phase application under 35 U.S.C. § 371 of International Application No. PCT/EP2018/054802, filed on Feb. 27, 2018, which claims the benefit of U.S. Provisional Patent Application No. 62/466,444, filed on Mar. 3, 2017 and European Patent Application No. 17160813.6 filed on Mar. 14, 2017. These applications are hereby incorporated by reference herein.

FIELD OF THE INVENTION

This invention relates to lighting systems for generating lighting effects, in particular based on a spot light design. The invention is for example of interest for use in stage, arena or concert lighting to provide color, shape or image generation on a surface or as a mid-air effect.

BACKGROUND OF THE INVENTION

Spot lighting basically aims to provide a collimated light output beam. The smaller the divergence of an output beam, in order to create a dense highly collimated beam, the larger the output lens that is required.

For simple spot light illumination, some known designs make use of a simple parabolic mirror with an arc lamp in the focal plane of the mirror. These designs are generally called search lights. These provide a compact lighting solution. However, they do not enable significant control of the light output effect. For example, no image can be displayed as there is no place (i.e. gate) at which the light source is focused, and where an image generation or image modification system could be placed. Similarly, there is no option to implement color filtering other than by providing a single (large) filter at the front of the parabolic mirror.

In many applications, such as for stage and concert lighting but more generally for creating different atmospheric lighting effects using spot lighting, it is desirable to be able to control a color, shape or image to be generated by the spot lighting system. This can be achieved by providing a focal plane at which the light source output is focused before forming the collimated light output beam. Image, color or shape modification may then take place at that focal plane.

Spot light systems which implement this functionality are also known.

Refracting lenses are generally used as the final beam forming elements (the so-called "front group" of lenses) within such spot light applications. However, refracting lenses introduce chromatic aberration. This means that the edge of the beam has a rainbow effect. In order to correct for this chromatic aberration, additional lenses may be used, but this adds cost, weight and size to the spot light design. For example, at least three lenses instead of one are usually required.

There is therefore a need for a lighting system which has controllable light output characteristics, such as color, shape or image, which can be implemented with low weight and cost, and which can avoid the problems associated with chromatic aberration of refractive lenses.

SUMMARY OF THE INVENTION

The invention is defined by the claims.

According to examples in accordance with an aspect of the invention, there is provided a lighting system, comprising:
 a light source for generating a light source output;
 an optical system for focusing the light source output to a beam control plane;
 a first lens system for pre-shaping the light source output after the beam control plane;
 a first reflector, wherein the first lens system is adapted to direct light to the first reflector; and
 a second reflector for generating an output beam from the light reflected by the first reflector.

This system provides focused light at a beam control plane, so that control of the color and/or shape of the output beam may be implemented by providing a suitable control element at the beam control plane. The two reflectors in combination with the lens system or systems function as a catadioptric optical system, and they avoid the need for large refractive output lenses and hence avoid the need for chromatic aberration compensation. Furthermore, for the same focal length, a mirror radius of curvature is double that of the equivalent refractive plano-convex lens, so that the overall system can be more compact (in the optical axis direction). The reflectors also can be formed thinner and hence lighter than their refractive equivalents.

The system preferably comprises a beam control system located at the beam control plane. The beam control system enables the characteristics of the output beam to be controlled, such as the color or shape or even enables the generation of a pixelated image. The optical parts of the system beyond the beam control plane together function as a projection system, for projecting the image at the beam control plane to the collimated output of the system. This enables any desired light output effect to be generated.

The beam control system may comprise a color filter for selecting a beam output color or a shape generating feature for forming a desired outer shape of the beam. Color filters may for example be manually insertable into the beam control plane.

The beam control system may comprise a pixelated display device for providing pixelated modulation of the light passing through the display device. In this way, the lighting system may function as an image projector. The pixelated display device for example may comprise a liquid crystal panel, or a MEMs deformable mirror array, or any other miniature controllable display device, with the light source functioning as a backlight of the display, and the display device providing electrically controllable light modulation.

The first lens system may comprise a lens group of three lenses. This lens group provides reshaping of the beam so that the light covers the area of the first reflector, and obscuration caused by the first reflector is minimized.

In one arrangement, the first reflector comprises a hyperbolic mirror and the second reflector comprises a parabolic mirror, as shown in FIG. 7a. This defines the Cassegrain reflecting telescope configuration.

In another arrangement, the first reflector comprises a hyperbolic mirror and the second reflector comprises a hyperbolic mirror, as shown in FIG. 7b. This defines the Ritchey-Chrétien reflecting telescope configuration.

In another arrangement, the first reflector and second reflector comprise spherical mirrors, as shown in FIG. 7c. This defines a Schwartzchild reflecting telescope configuration.

In another arrangement, the first reflector is a planar mirror and the second reflector comprises a hyperbolic mirror, as shown in FIG. 7d. This defines a Newtonian telescope configuration.

Thus, it will be clear that there are many different arrangements for the reflector pair. The output is a generally collimated beam, for example with a beam divergence (full angle) of less than 6 degrees.

The reflectors may comprise specular reflecting front coatings. However, the reflection may take place at the rear surface, for example if a Mangin mirror structure is used. A Maksutov reflecting mirror may also be used which combines a negative lens with a reflector.

In one set of examples, the first optical system comprises an ellipsoid reflector or a parabolic reflector, with the light source mounted at the focal plane of the reflector. The light source for example comprises an arc lamp or an LED or LED arrangement.

In another set of examples, the first optical system comprises a lens system at the output of the light source. In this way, the rear reflector is avoided, and a more compact system is provided. The light source for example comprises an array of LEDs and the lens system comprises a microlens array. The microlens array provides beam shaping and steering for each LED output to provide the desired focusing at the beam control plane.

The light source may comprise an annular array of LEDs. This provides an efficient system. The central area of the light source is obscured by the first reflector, so that the system is more efficient by omitting the central part of the light source. The opening in the annular LED design is thus matched to the obscuration resulting from the first reflector hence enabling a lossless system (in that all generated light contributes to the output beam).

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a lighting system in which a light source output is focused to a beam control plane. There is then a double-reflector output system for generating a generally collimated output beam, which has characteristics which can be modified at the beam control plane. The reflector output system reduces the size and weight of the system as well as reducing chromatic aberration effects.

Figure 1:
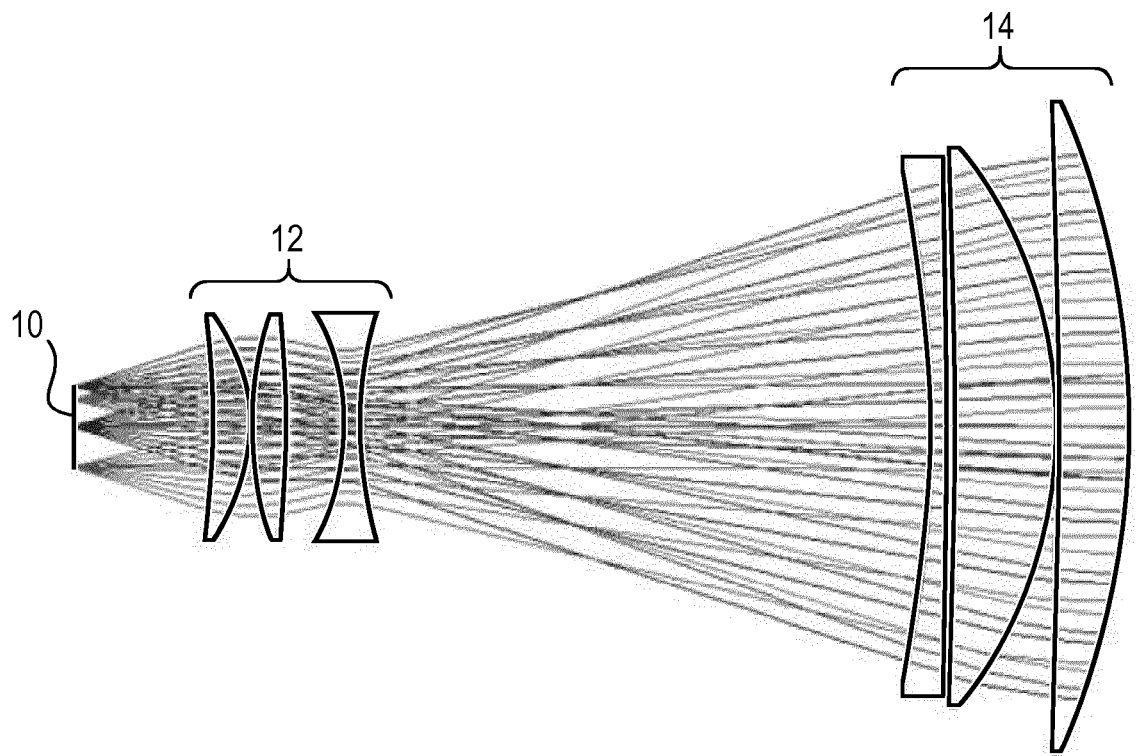
FIG. 1 shows a known spot light system which enables control of the characteristics of the output beam.

FIG. 1 shows a known spot light system which enables control of the characteristics of the output beam. A light source (not shown) has its output focused to a control plane 10. At the control plane, a template or stencil may be placed in order to control the characteristics of the light output beam. This stencil is known as a gobo, and the control plane is sometimes referred to as the gobo plane. The gobo may have a desired outer shape and/or it may comprise a pattern of holes.

The beam control plane is referred to as a gate, and it is at a point of focus between the light source and optics further downstream.

The gobo may be formed as sheet metal components, or glass sheets with a reflecting and/or color filtering pattern, or as plastic sheets particularly for low temperature LED lighting.

The optical system downstream of the beam control plane 10 comprises a rear lens group 12 and a front lens group 14. The chromatic aberration created by the large front lens group 14, and the weight and size of the front lens group particularly if multiple lenses are used to provide chromatic aberration compensation is employed, is an issue. A large output lens is required in the front lens group 14 to create the desired collimated beam. By way of example, the final output lens may have a diameter in the range 15 cm to 30 cm.

Figure 2:
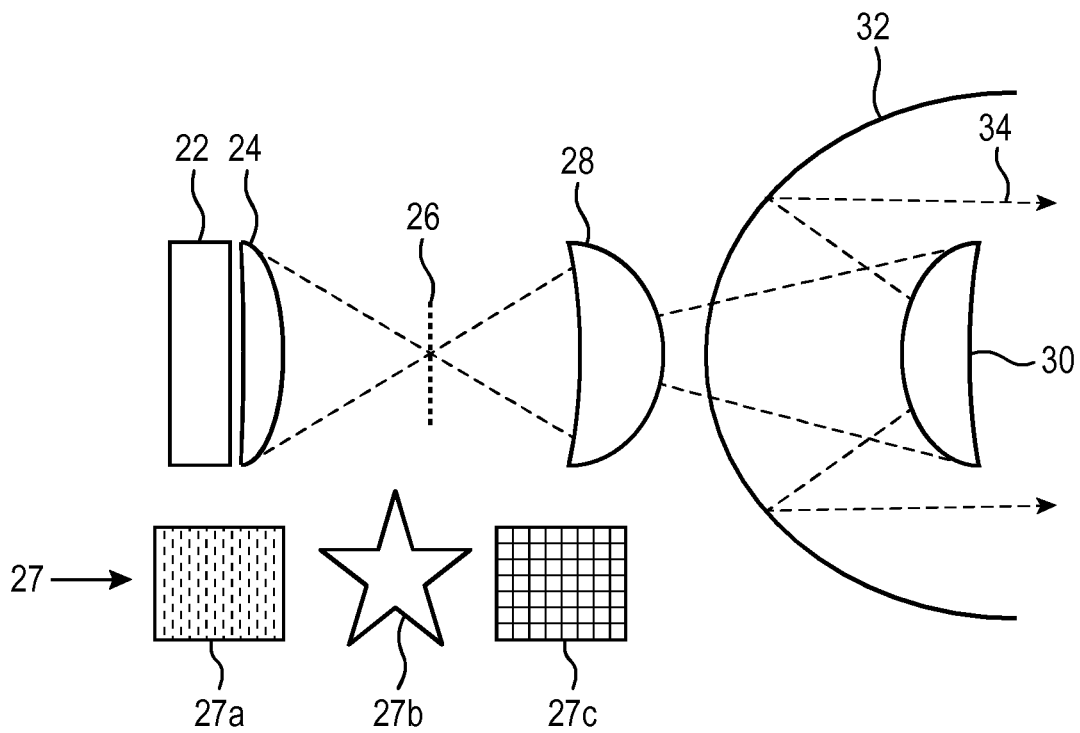
FIG. 2 shows in schematic form a lighting system in accordance with the invention.

FIG. 2 shows in schematic form a lighting system 20 in accordance with the invention.

The system comprises a light source 22 for generating a light source output. An optical system 24 focuses the light source output to a beam control plane 26. This is the gobo plane as explained above with reference to FIG. 1.

A first lens system 28 provides pre-shaping of the light source output after the beam control plane 26. It is designed to ensure that the light beam is mapped to the area of a first reflector 30. Thus, it images the exit pupil at the beam control plane 26 onto the first reflector 30. A second reflector 32 generates an output beam 34 from the light reflected by the first reflector 30.

Control of the color and/or shape of the output beam may be implemented by providing a suitable control element (e.g. a gobo) at the beam control plane.

FIG. 2 shows three possible designs for a beam control system 27. A first example is a color filter 27a, a second example is a shaped stencil 27b and a third example is a pixelated display 27c.

The two reflectors avoid the need for large refractive output lenses and hence avoid the need for chromatic aberration compensation. They may result in reduced size and weight of the overall system.

Any type of beam control system 27 may be located at the beam control plane 26. Known gobos enable the characteristics of the output beam to be controlled, in particular the beam shape or beam color or enable the generation of an output image.

The beam control system may be static (such as a stencil or other template, or a color filter) but it may also be dynamically controllable. For this purpose, the beam control system may comprise an electronically controllable display system 27c for modulating the light from the light source to create a dynamically controllable image. For this purpose, various display technologies may be used such as liquid crystal panels or micro electro mechanical system (MEMs) devices, such a deformable mirror arrays or MEMs shutter arrays. The light source functions as the backlight, and the display system provides pixelated light modulation.

The optical parts of the system beyond the beam control plane 26 together function as a projection system, for projecting the image at the beam control plane to the collimated output of the system.

There are various options for the implementation of the different components of the system, some of which will be described below. However, one detailed example will first be presented.

Figure 3:
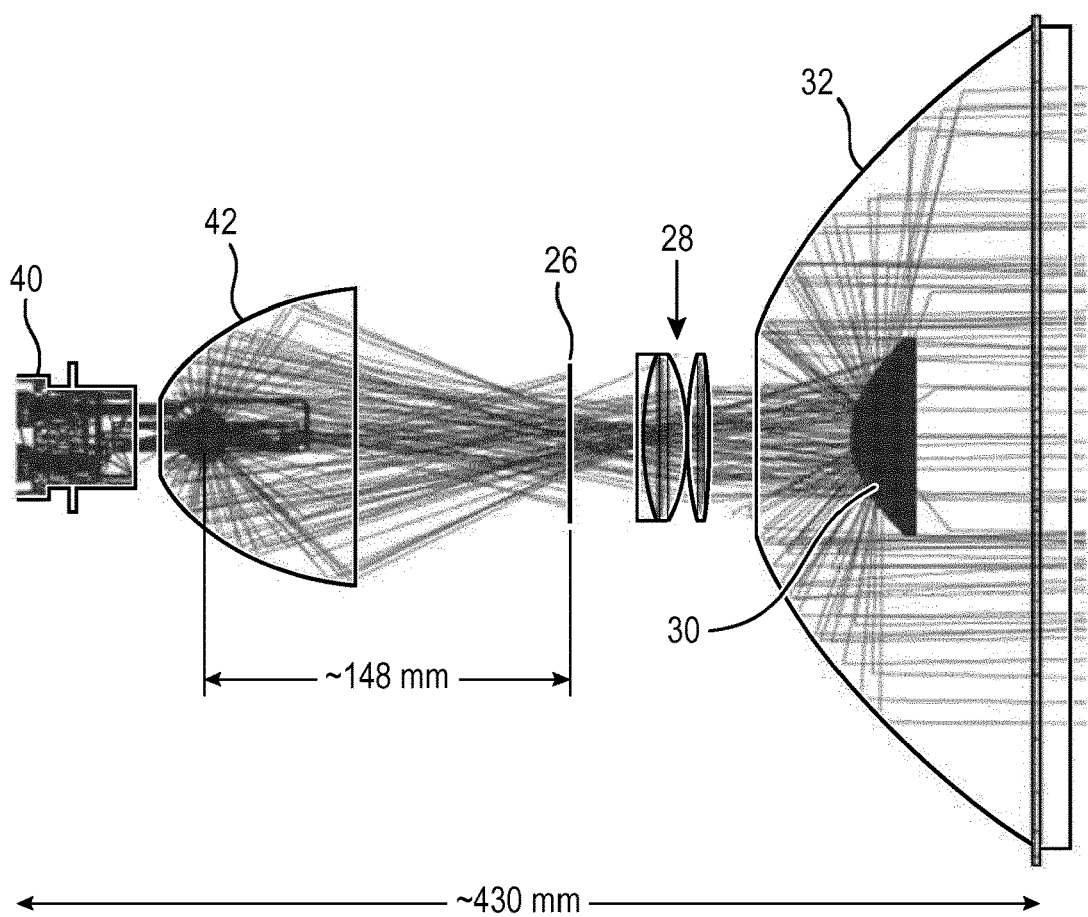
FIG. 3 shows detailed example based on an arc discharge lamp at the focal point of an ellipsoid reflector.

FIG. 3 shows an example based on an arc discharge lamp 40 at the focal point of an ellipsoid reflector 42 (which functions as the optical system 24 of FIG. 2). The arc lamp is for example a 1500 W lamp. The diameter of output of the system is 340 mm.

In this specific example, the reflector 42 has the parameters shown in Table 1 below.

TABLE 1

| a | 112.5 | mm | semi-major axis |
|---|---|---|---|
| b | 64.031 | mm | semi-minor axis |
| R | 36.44417 | mm | Radius |
| e | 0.822224 | | eccentricity |
| cc | −0.67605 | | Conic Constant |
| f | 20.00 | mm | focal |

The beam control plane 26 (the gobo plane) is at 148 mm from the arc lamp in this example.

The first lens system 28 comprises a lens group of three lenses.

Figure 4:
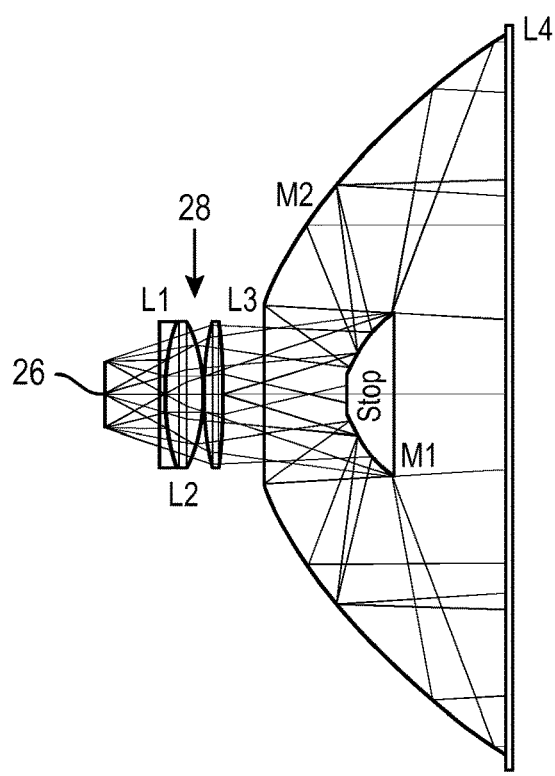
FIG. 4 shows the lenses of the system of FIG. 3 in more detail.

FIG. 4 shows the lenses in more detail. The lens group has lenses L1, L2 and L3 in order from the beam control plane 26 and there is a planar output cover denoted as L4.

The design of FIGS. 3 and 4 for example achieves the following optical characteristics (to a first order approximation):
Focal length: 295 mm
f number: f/1
Obscuration ratio: 0.24
Field of view: 31.6 mm (the size of the beam control plane)
Beam divergence: <6 degrees The focal length refers to the optical system from the first lens L1 to the first reflector M1.

The f number of the optical system is defined as the ratio of the focal length divided by the diameter of the output beam (not the second reflector M2 diameter).

The obscuration ratio is the linear ratio of the large mirror diameter and the small mirror diameter. The area ratio is the square of that value.

Table 2 below shows the parameters of the components shown in FIG. 4.

represents a convex surface as seen from the beam control plane 26, i.e. a surface which bows towards the beam control plane 26.

IMA refers to the image plane and OBJ refers to the object plane. The stop is a physical aperture (hard aperture) that is coincident with the image of the entrance pupil. In the design shown, the stop is at the reflector M1 to provide the minimum obscuration, but this is not essential.

CAO is the clear aperture output, which is usually the diameter of the lens where optical requirements such as finish, radius of curvature, coatings, are met. This is also known as the unobstructed aperture. The clear aperture output is usually smaller than the mechanical aperture by a few millimeters.

The conic coefficient value defines the aspheric shape of the curvature (conic=0 is equivalent to a sphere, conic=−1 is a parabola, 0<conic<−1 is an ellipsoid and conic<−1 is a hyperbola).

The system is designed to minimize stray light and back reflections by preventing some light close by the optical axis from bouncing back from the first reflector M1 and traveling back to the gobo plane. The way to minimize reflection of that unusable light is to allow it pass through the mirror by having no reflective coating. The light is then blocked by the mirror support (for example a mechanical mount with spider web arms) which functions as a heatsink. The 18 mm obscuration is the diameter of that hole which lets the light pass through.

In this arrangement, the first reflector M1 comprises a hyperbolic mirror and the second reflector M2 comprises a parabolic mirror. This defines a Cassegrain reflecting telescope configuration.

Figure 5:
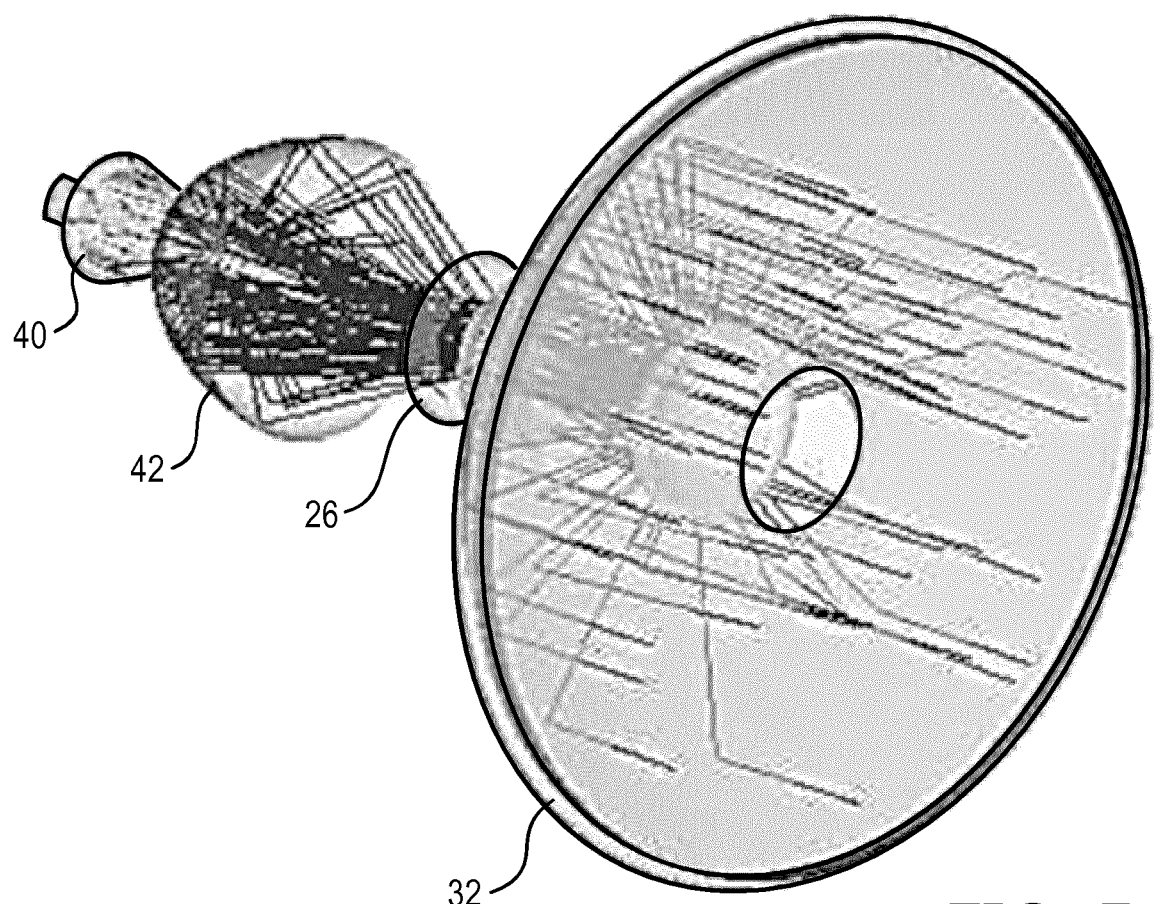
FIG. 5 shows a perspective view of the design of FIG. 3.

FIG. 5 shows a perspective view of the design of FIG. 3.

The front window is required for protection purposes. It can also be shaped as a lens or can also be of any type to generate effects (either in mid-air or at the image plane).

Many different configurations for the reflector pair are possible.

For example, the first reflector may comprise a hyperbolic mirror and the second reflector may comprise a hyperbolic mirror. This defines a Ritchey-Chrétien reflecting telescope configuration.

The first reflector and second reflector may comprise spherical mirrors to define a Schwartzchild reflecting tele-

TABLE 2

| Lens | Radius (mm) | conic | Thickness (mm) | Glass | GlassCode | Diameter (mm) | CAO (mm) | Obscuration (mm) |
|---|---|---|---|---|---|---|---|---|
| OBJ | Infinity | | 27.289 | | | 31.8 | | |
| L1 | 2161.736 | | 3.0 | S-FSL5 | 487702 | 68 | 66 | |
| | 105.881 | | 9 | | | 66 | 66 | |
| L2 | −241.96 | | 8.5 | S-LAM55 | 762401 | 66 | 66 | |
| | −78.459 | | 0.1 | | | 68 | 66 | |
| L3 | 128.121 | | 9 | S-LAM55 | 762401 | 68 | 66 | |
| | −228.530 | | 58.5 | | | 68 | 66 | |
| M1(stop) | 30.908 | −1.335 | −45.817 | B270(*) | 523586 | 82 | 80 | 18 (AR coated or uncoated) |
| M2 | 176 | −1 | 121 | Mirror | | 340 | 338 | 83.8 (hole) |
| L4 | Infinity | | 2.75 | B270(*) | 523586 | 344 | 342 | |
| (Window) | Infinity | | 12000 | | | 344 | 342 | |
| IMA | Infinity | | | | | 1456 | | |

The two values of thickness for each lens represent the lens thickness and the air gap to the next component in the lens system. The curvature is given for the input face and the exit face of each lens L1 to L3, wherein a positive radius scope configuration, or the first reflector may be a planar mirror to define a Newtonian telescope configuration. The beam divergence (full angle) is preferably less than 6 degrees.

The two reflectors may comprise coated plastic or metal substrates so that reflection is off the front face. However, Mangin mirror structures may be used. Other reflector designs may be used such as a Maksutov reflecting mirror.

A parabolic reflector may be used instead of an ellipsoid reflector.

The example above is for a large (340 mm diameter) system. However, the design of the invention can be scaled to larger and smaller designs.

The example above is based on an arc discharge lamp. However, the system may make use of an LED light source, for example an array of LEDs. This gives further options for system improvement.

First, an LED light source enables the use of a rear reflector (the ellipsoid or parabolic reflector) to be avoided, by having forward facing optics.

Figure 6:
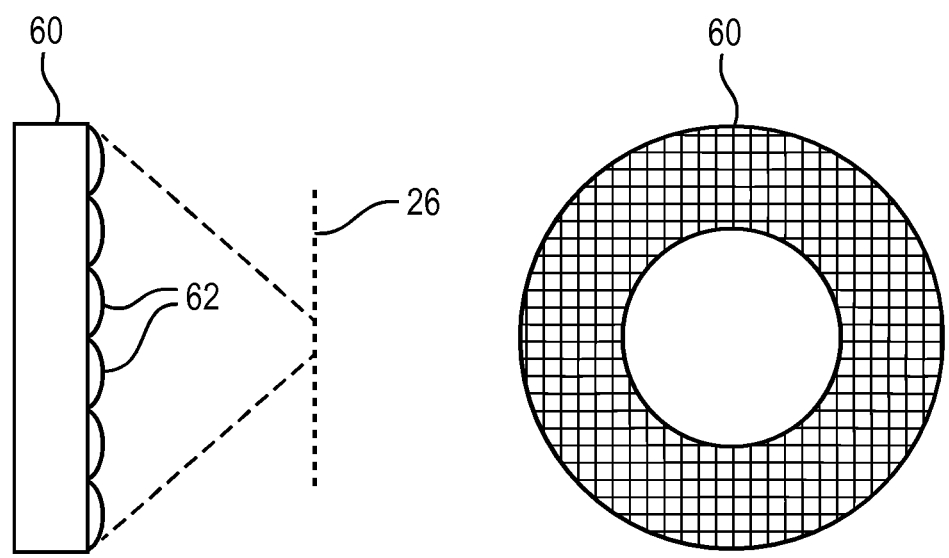
FIG. 6 shows an LED array having an array of microlenses functioning as the optical system of FIG. 2.
Figure 7A:
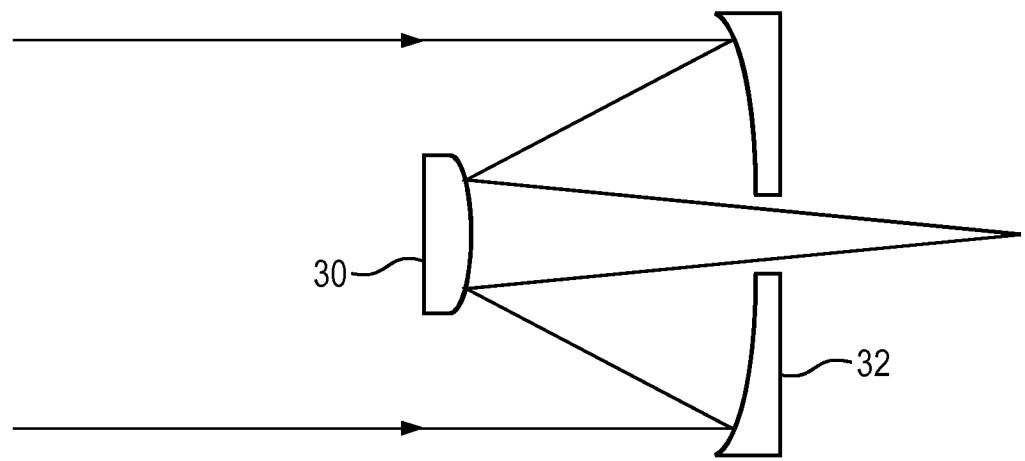
FIG. 7a-7d show different first and second reflector arrangements in accordance with the invention.
Figure 7B:
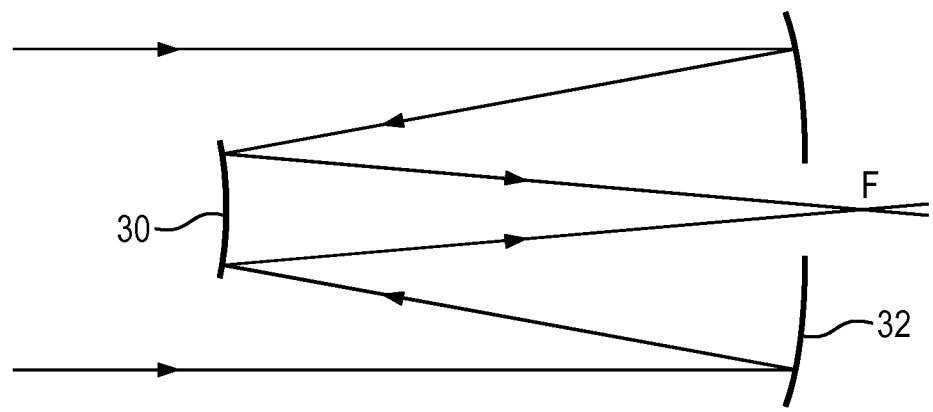
Figure 7C:
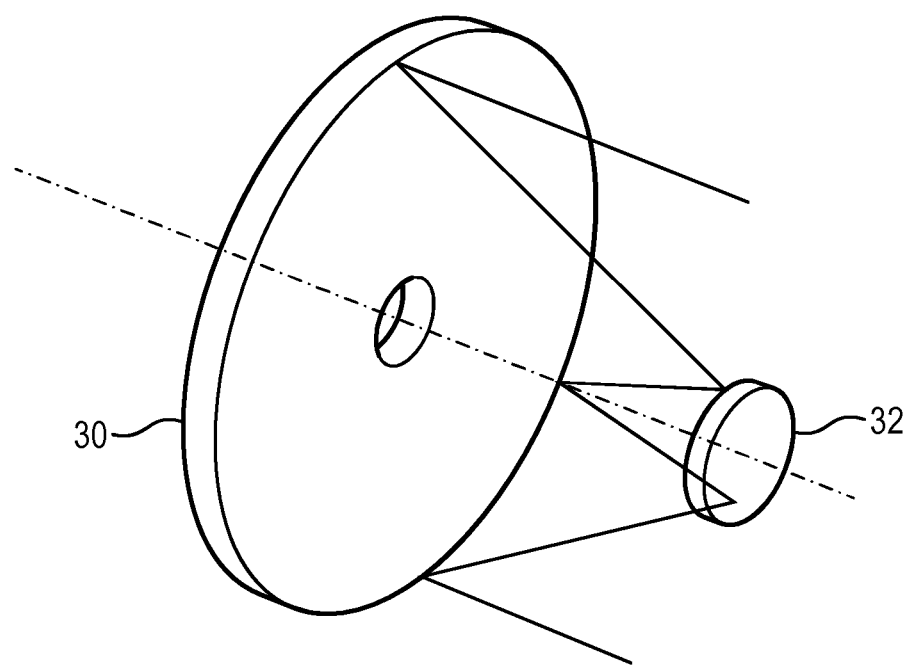
Figure 7D:
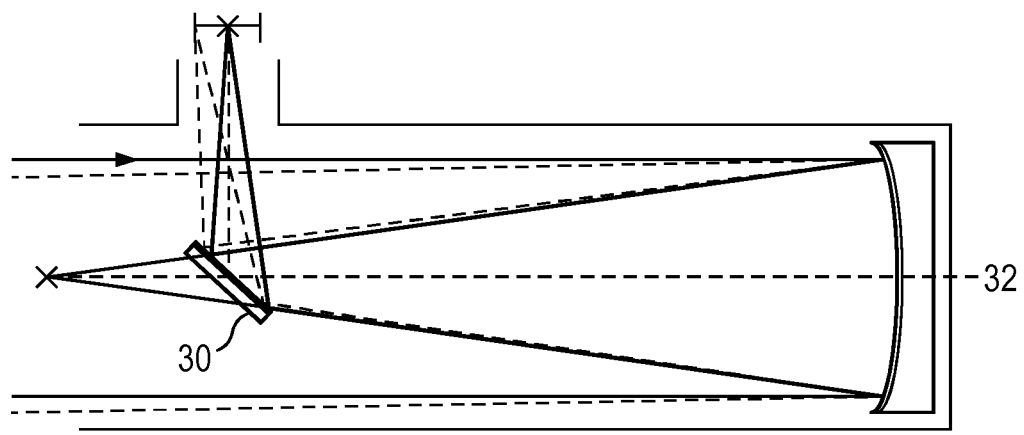

FIG. 6 shows an LED array 60 having an array of microlenses 62 functioning as the optical system 24 of FIG. 2. Each microlens functions as a local collimator and beam steering system. Together they form a fly-eye lens arrangement. A further shared condenser lens may also be provided over the micro lens array (not shown).

One particular advantage of the use of an LED array is that the shape of the light output area can be selected. FIG. 6 shows an annular shape. The central part of the light source output is in any case obscured by the first reflector 30 further optically downstream. Thus, by removing light source output from this area, the light efficiency is improved, so that a high intensity system may be based on an LED light source arrangement. The opening in the annular LED array then matched to the obscuration resulting from the first reflector.

As explained above, the invention is of particular interest for lighting systems in which surface lighting effects are desired. However, the invention is also applicable without such surface effects being used, for example for aerial surveillance application such as helicopter search lights. The advantages of low weight, high efficiency, and compact size, are all of benefit in this and other applications, where image generation or color control may not be needed.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting system, comprising:
a light source for generating a light source output;
an optical system for focusing the light source output to a beam control plane;
a first lens system for pre-shaping the light source output after the beam control plane;
a first reflector, wherein the first lens system is adapted to direct light to the first reflector;
a second reflector for generating a collimated output beam from the light reflected by the first reflector;
a beam control system located at the beam control plane, wherein the beam control system includes a pixelated display device for providing pixelated modulation of the light passing through the display device, and
wherein the first reflector and second reflector are selected from the group consisting of: the first reflector is a hyperbolic mirror and the second reflector is a parabolic mirror, the first reflector is a hyperbolic mirror and the second reflector is a hyperbolic mirror, the first reflector and second reflector are spherical mirrors and the first reflector is a planar mirror and the second reflector is a hyperbolic mirror; and
wherein the first lens system, first reflector and second reflector are configured to function as a catadioptric optical system.

2. A system as claimed in claim 1, wherein the beam control system comprises:
a color filter; or
a shape generating feature.

3. A system as claimed in claim 1, wherein the pixelated display device comprises a liquid crystal panel, or a MEMs deformable mirror array.

4. A system as claimed in claim 1, wherein the first lens system comprises a lens group of three lenses (L1, L2, L3).

5. A system as claimed in claim 1, wherein the first optical system comprises an ellipsoid reflector or a parabolic reflector, with the light source mounted at the focal plane of the reflector.

6. A system as claimed in claim 5, wherein the light source comprises an arc lamp or an LED or LED arrangement.

7. A system as claimed in claim 1, wherein the first optical system comprises a lens system at the output of the light source.

8. A system as claimed in claim 7, wherein the light source comprises an array of LEDs and the lens system comprises a microlens array.

9. A system as claimed in claim 7, wherein the light source comprises an annular array of LEDs.

* * * * *